US012807770B2

(12) United States Patent
Galagan et al.

(10) Patent No.: US 12,807,770 B2
(45) Date of Patent: Nov. 24, 2026

(54) WATER-SOLUBLE ARTICLES

(71) Applicants: Alexandra Galagan, Paris (FR); Manojle Manojlovic, Paris (FR)

(72) Inventors: Alexandra Galagan, Paris (FR); Manojle Manojlovic, Paris (FR)

( * ) Notice: Subject to any disclaimer, the term of this patent is extended or adjusted under 35 U.S.C. 154(b) by 669 days.

(21) Appl. No.: 18/245,951

(22) PCT Filed: Sep. 21, 2021

(86) PCT No.: PCT/EP2021/075961

§ 371 (c)(1),
(2) Date: Mar. 20, 2023

(87) PCT Pub. No.: WO2022/058619

PCT Pub. Date: Mar. 24, 2022

(65) Prior Publication Data

US 2024/0010800 A1 Jan. 11, 2024

(30) Foreign Application Priority Data

Sep. 21, 2020 (EP) .................................... 20306069

(51) Int. Cl.

| | |
|---|---|
| ***C08L 29/04*** | (2006.01) |
| ***C08J 3/12*** | (2006.01) |
| ***C08J 5/18*** | (2006.01) |
| ***C08L 3/02*** | (2006.01) |
| ***C08L 89/00*** | (2006.01) |
| ***C08L 91/00*** | (2006.01) |
| *C08L 3/04* | (2006.01) |

(52) U.S. Cl.

CPC . *C08J 3/12* (2013.01); *C08J 5/18* (2013.01); *C08L 3/02* (2013.01); *C08L 29/04* (2013.01); *C08L 89/00* (2013.01); *C08L 91/00* (2013.01); *C08J 2329/04* (2013.01); *C08J 2403/04* (2013.01); *C08J 2489/00* (2013.01); *C08L 3/04* (2013.01); *C08L 89/005* (2013.01); *C08L 2201/06* (2013.01); *C08L 2205/03* (2013.01)

(58) Field of Classification Search

CPC .... C08L 29/04; C08L 3/02; C08L 3/04; C08L 91/00; C08L 89/00; C08L 89/005; B29B 9/06; B29B 9/065; B29B 9/12

See application file for complete search history.

(56) References Cited

U.S. PATENT DOCUMENTS

| | | | | |
|---|---|---|---|---|
| 5,766,529 | A | 6/1998 | Franke et al. | |
| 6,635,275 | B1 * | 10/2003 | Scott | A61K 9/4816 424/463 |
| 7,854,994 | B2 * | 12/2010 | Henderson-Rutgers | B32B 1/00 524/53 |
| 11,578,193 | B2 * | 2/2023 | Ota | C08L 3/04 |
| 2017/0081442 | A1 * | 3/2017 | Johnson | C08K 5/06 |

FOREIGN PATENT DOCUMENTS

| | | | | | |
|---|---|---|---|---|---|
| CN | 106167556 | A | * | 11/2016 | C08L 3/02 |
| CN | 106279960 | A | | 1/2017 | |
| CN | 106496986 | A | * | 3/2017 | C08J 5/18 |
| CN | 106947196 | A | * | 7/2017 | C08L 29/04 |
| CN | 107474554 | A | | 12/2017 | |
| CN | 107522987 | A | * | 12/2017 | C08L 29/04 |
| CN | 109486073 | A | * | 3/2019 | C08L 75/04 |

OTHER PUBLICATIONS

CN-106947196-A (Jul. 14, 2017); machine translation. (Year: 2017).*
International Search Report mailed, Jan. 14, 2022, for PCT/EP2021/075961.

* cited by examiner

*Primary Examiner* — Rip A Lee
(74) *Attorney, Agent, or Firm* — ArentFox Schiff LLP

(57) ABSTRACT

The present invention relates to a pellet for manufacturing water-soluble articles comprising:
at least one polyvinyl alcohol;
at least one vegetable oil;
at least one modified starch;
optionally at least one protein.

12 Claims, No Drawings

WATER-SOLUBLE ARTICLES

CROSS-REFERENCE TO RELATED APPLICATIONS

This application is a National Phase of PCT/EP2021/075961, filed on Sep. 21, 2021, which claims priority to EP Application Serial No. 20306069.4, filed on Sep. 21, 2020, the disclosures of which are hereby incorporated by reference in their entireties.

FIELD OF THE INVENTION

The present invention relates to water-soluble articles, in particular cold water or hot water-soluble articles, as well as to pellets for manufacturing said water-soluble articles.

BACKGROUND OF THE INVENTION

Every year, around 500 billion plastic bags are used worldwide. Most of them are made from polyethylene, a petroleum-derived material. The main environmental threat of conventional plastics is their high durability (between 100 and 500 years) and the persistence of macro- and micro-plastics in both soil and water. These particles can carry pesticides and their ingestion by sea animals introduces these pollutants to the food chain.

Polymer industry and research are increasingly pointing towards more environment-friendly solutions for plastics production.

Starch plastics have been developed for their biobased origin and potential biodegradability. However, properties of starched-based plastic are influenced by many factors such as temperature and storage condition. As such, the performance of these plastics must be improved by the use of many additives which may be unsafe and potentially toxic.

Accordingly, alternatives to conventional plastics have been developed, such as water-soluble polymer films. Indeed, such water-soluble polymer films are widely used as packaging materials to simplify the dispersion, pouring, dissolving and dosing of the material to be delivered. By way of example, polyvinyl alcohol (PVA) films have been used to form unit dose packages comprising laundry detergent or biodegradable water-soluble shopping bags, such as those described in International application WO2018041262.

However, the biodegradability of such PVA-based films is often unsatisfactory. Besides, the water sensibility of these PVA films limits their use e.g. as packaging or as shopping bags in rainy weather conditions. Moreover, PVA-based films also lack resistance.

Thus, there is a need for alternatives to current biodegradable water soluble PVA films.

SUMMARY OF THE INVENTION

The present invention arises from the unexpected finding, by the inventors, that articles made from pellets comprising at least one polyvinyl alcohol, at least one vegetable oil, at least one modified starch, and at least one protein are essentially completely soluble in hot water and present good biodegradability properties, while being cold water-resistant. The inventors have also found that articles made from pellets comprising at least one polyvinyl alcohol, at least one vegetable oil and at least one modified starch are soluble in cold water.

Thus, the present invention relates to a pellet for manufacturing water-soluble articles, in particular cold water or hot water-soluble articles, comprising:

- at least one polyvinyl alcohol;
- at least one vegetable oil;
- at least one modified starch;
- optionally at least one protein.

In an embodiment, the invention relates to a pellet for manufacturing hot water-soluble articles comprising:

- at least one polyvinyl alcohol;
- at least one vegetable oil;
- at least one modified starch;
- at least one protein.

In another embodiment, the invention relates to a pellet for manufacturing cold water-soluble articles comprising:

- at least one polyvinyl alcohol;
- at least one vegetable oil;
- at least one modified starch.

The present invention also relates to the use of at least one pellet as defined above for the manufacture of a water-soluble article, in particular a cold water or a hot water-soluble article.

The present invention also relates to a method for the manufacture of a water-soluble article, in particular a cold water or hot water-soluble article, comprising a step of heating at least one pellet as defined above at a temperature of at least 5° C.

The present invention also relates to a water-soluble article, in particular a cold water or hot water-soluble article obtainable or obtained from at least one pellet as defined above.

DETAILED DESCRIPTION OF THE INVENTION

Pellet

As intended herein the term "pellet" is equivalent to the term granule and refers to a small rounded or tube-shaped compressed mass. Typically, a pellet is about 1 to 10 mm in diameter and between 5 and 50 mm in length.

Polyvinyl alcohol (PVA, PVOH) is a well-known water-soluble resin of low toxicity.

Preferably, the polyvinyl alcohol according to the invention has a molecular weight from about 10 000 to about 200 000, preferably from about 10 000 to about 175 000, and more preferably from about 20 000 to about 75 000.

Preferably, the polymerization degree of the polyvinyl alcohol according to the invention is of from about 500 to about 2 400. More preferably, the polyvinyl alcohol according to the invention is selected from the group consisting of PVA0599, PVA1788, PVA1792, PVA1799, PVA2499 and mixtures thereof.

Preferably, the polyvinyl alcohol according to the invention is prepared by hydrolysis of polyvinyl acetate. As intended herein, the degree of hydrolysis is the percentage of vinyl acetate units converted to vinyl alcohol units. Preferably, the degree of hydrolysis of the polyvinyl alcohol according to the invention is at least 80%, 81%, 82%, 83%, 84%, 85%, 86%, 87%, 88%, 89%, 90% or 91% and at most 90%, 91%, 92%, 93%, 94%, 95%, 96%, 97%, 98%, 99% or 100%. Preferably, the degree of hydrolysis of the polyvinyl alcohol according to the invention is from about 80% to about 100%, more preferably from about 85% to 100% and even more preferably from about 87% to 99%. Advantageously, polyvinyl alcohol with a degree of hydrolysis of at least 80% yield pellets and articles highly soluble in water, in particular in cold or hot water.

Modified starch also known as starch derivatives are well known to the person skilled in the art. Modified starch can be obtained from any known sources of starch. By way of example of suitable starch according to the invention, it is possible to cite corn starch, potato starch, sweet potato starch, wheat starch, cassava starch, sago starch, tapioca starch, rice starch, bean starch, kudzu starch, bracken starch, lotus starch or water chestnut starch. Preferably, the modified starch according to the invention is a tapioca, potato or corn starch.

Starch can be modified by any known methods in the art. Typically modified starch can be prepared by physically, enzymatically or chemically treating starch.

Preferably, the modified starch according to the invention is a chemically modified starch, more preferably selected from the group consisting of esterified starch, etherified starch, cationized starch, acetylated starch, and crosslinked starch. More preferably the modified starch according to the invention is an acetylated starch. Most preferably, the modified starch according to the invention is an acetylated distarch adipate (ADiSP), in particular of tapioca, potato or corn starch.

As intended herein the vegetable oil is an oil extracted from seeds, fruit or any part of a plant. The vegetable oil can be obtained by any method known to the person skilled in the art such as mechanical extraction or chemical extraction.

The vegetable oil according to the invention can be any vegetable oil well known to the person skilled in the art. Preferably, the vegetable oil according to the invention is selected from the group consisting of soybean oil, coconut oil, castor oil, cottonseed oil, grape seed oil, rapeseed, corn oil, palm oil, linseed oil, safflower oil, olive oil, peanut oil, coconut oil, palm kernel oil, canola oil, sunflower oil, hazelnut oil, sesame oil, almond oil, lemon oil and mixture thereof. More preferably, the vegetable oil according to the invention is coconut oil, palm oil or soybean oil. Preferably, the vegetable oil according to the invention is not epoxidized.

Preferably, the protein according to the invention is from a natural or renewable source, such a plant or an animal source. More preferably, the protein according to the invention is selected from the group consisting of whey protein, almond protein, soybean protein, casein, egg white protein, and mixtures thereof. Most preferably, the protein according to the invention is casein.

Preferably, the pellet according to the invention comprises the at least one polyvinyl alcohol in an amount from about 55% to about 70% by weight of the total weight of the pellet.

Preferably, the pellet according to the invention comprises the at least one vegetable oil in an amount from about 10% to about 30%, in particular from about 10% to about 20%, by weight of the total weight of the pellet.

Preferably, the pellet according to the invention comprises the at least one modified starch in an amount from about 7% to about 15% by weight of the total weight of the pellet.

Preferably, the pellet according to the invention comprises the at least one protein in an amount from about 7% to about 10% by weight of the total weight of the pellet.

In an embodiment, the pellet according to the invention further comprises at least one additional compound selected from the group consisting of a compatibilizer, a binder, a filler, a plasticizer, an agent for lower moisture absorption, a lubricant, an antioxidant, a mold release agent an antifoaming agent, a colorant, ultraviolet absorber and mixture thereof.

By way of example of suitable additional compound according to the invention, it is possible to cite microcrystalline cellulose, silica, metallic oxides, calcium carbonate, talc, mica, glycerin, diglycerin, sorbitol, ethylene glycol, diethylene glycol, sodium sulfite, potassium sulfite, stearic acid, zinc stearate, calcium stearate and hydrated magnesium silicate powder and mixture thereof.

Preferably, the at least one additional compound according to the invention is present in the pellet in an amount from about 0.2% to about 5%, in particular from about 0.2% to about 2.5%, by weight of the total weight of the pellet. Preferably, the at least one additional compound according to the invention is present in the pellet in an amount of at least 0.2%, 0.3%, 0.4%, 0.5%, 0.6%, 0.7%, 0.8% and 0.9% by weight of the weight the pellet and at most 5%, 4%, 3%, 2.5%, 2.4%, 2.3%, 2.2%, 2.1%, 2.0%, 1.9% and 1.8% by weight of the total weight of the pellet.

In an embodiment, the present invention relates to a method for the preparation of a pellet according the invention. Preferably, the method for the preparation of the pellet comprises a step of stirring a composition comprising at least one polyvinyl alcohol, at least one vegetable oil, at least one modified starch and at least one protein as defined above at a temperature of at least 5° C., preferably at a temperature of about 5° C. to about 120° C., more preferably at a temperature of about 10° C. to about 120° C. Advantageously, the step of stirring has the effect of releasing the moisture of the composition.

After the step of stirring, the composition is preferably placed in a pellet manufacturing machine at a temperature of at least 5° C. in order to form the pellet. Pellet manufacturing machine are well known to the person of skilled in the art and can be of any type. However, it is preferred that the pellet manufacturing machine according to the invention is a twin screw extruder.

Water-Soluble Article

The pellet according to the invention is suitable for the manufacture of water-soluble articles, in particular cold water or hot water-soluble article. As such, the present invention also relates to the use of a pellet as defined above for the manufacture of a water-soluble, in particular a cold water or hot-water soluble article.

The present invention also relates to a method for the manufacture of a water-soluble article, in particular a cold water or hot water-soluble article, comprising a step of heating at least one pellet as defined above at a temperature of at least 5° C. The water-soluble, in particular the cold water or hot water-soluble article, can be prepared from the pellet according to the invention by numerous methods well known by the person skilled in the art. By way of example, the water soluble, in particular the cold water or hot water-soluble article, according to the invention can be prepared by blow molding, by blow extrusion and/or by sheet extrusion.

The cold water-soluble article according to the invention is capable of dissolving, in particular completely dissolving, in hot water.

The hot water-soluble article according to the invention is capable of dissolving, in particular completely dissolving, in hot water. As intended herein hot water refers to a water having a temperature, in particular at the atmospheric pressure, of at least 40° C., 50° C., 60° C., 70° C. or 80° C. Preferably, hot water according to the invention has a temperature, in particular at the atmospheric pressure, of at least 80° C.

The cold water-soluble article according to the invention is capable of dissolving, in particular completely dissolving, in water, in particular in cold water. As intended herein cold water refers to a water having a temperature, in particular at the atmospheric pressure, of less than 25° C., 24° C., 23° C., 22° C., 21° C., 20° C., 18° C. or 15° C. Preferably, cold water according to the invention has a temperature, in particular at the atmospheric pressure, of less than 25° C. Preferably, cold water according to the invention has a temperature, in particular at the atmospheric pressure, of at least 10° C., more preferably at least 15° C.

Preferably, at least 90% of the water-soluble, in particular the cold water or hot water-soluble article, according to the invention, in particular under the form a film having a thickness of 200 μm at the most, is dissolved when placed in contact of water, in particular cold or hot water respectively, more preferably at least 95%, 99% or 100% of the water-soluble article, in particular the cold water or hot water-soluble article, according to the invention is dissolved when immersed in water, in particular in cold or hot water respectively. More preferably, the water-soluble article, in particular the cold water or hot water-soluble article, according to the invention, in particular under the form a film having a thickness of 200 μm at the most, is completely dissolved when immersed in water, in particular in cold or hot water respectively.

Preferably, the water-soluble article, in particular the cold water or hot water-soluble article, according to the invention, in particular under the form a film having a thickness of 200 μm at the most, dissolves when immersed in water, in particular in cold or hot water respectively, in less than 10 minutes, more preferably in less than 5 minutes, and most preferably in less than 2.5 minutes.

Advantageously, from about 80% (w/w) to about 95% (w/w) of the hot water-soluble article according to the invention, in particular under the form a film having a thickness of 200 μm at the most, is dissolved when buried in the soil after 60 days.

Advantageously, the water soluble, in particular the cold water or hot water-soluble article, according to the invention is biodegradable.

Advantageously, the hot water-soluble article according to the invention is cold-water resistant, i.e. the hot water-soluble article according to the invention essentially does not dissolve when immersed cold water. As intended herein, cold water has a temperature, in particular at the atmospheric pressure, of less than 25° C., 24° C., 23° C., 22° C., 21° C., 20° C., 18° C. or 15° C. Advantageously also, the hot water-soluble article according to the invention is resistant to saliva, sweat and to cold air. As intended herein, cold air has temperature, in particular at the atmospheric pressure, of less than 18° C., 10° C., 5° C. or 0° C.

Preferably, the thickness of the water-soluble article, in particular the cold water or hot water-soluble article, in particular when it is under the form of a film, is of about μm to about 200 μm, more preferably from about 25 μm to about 175 μm.

The water-soluble, in particular the cold water or hot water-soluble article according to the invention is preferably selected from the group consisting of a film, a bag, such as a shopping bag or a garbage bag, a container, a pouch, a packaging, in particular for a unit dose, a glove, a disposable hygiene product, such as aprons, mobcaps, masks or shoe covers, and an envelope. The film according to the invention can be used for example to produce a water-soluble, in particular a cold water or hot water-soluble, bag, in particular shopping bag or garbage bag, container, pouch, packaging, in particular for unit doses, glove, disposable hygiene product, such as aprons, mobcaps, masks or shoe covers, or envelope.

The water-soluble article, in particular the cold water or hot water-soluble article, according to the invention is useful for various packaging purposes, particularly unit packaging and can package products or compositions in the form of a liquid, a solid, a powder or mixtures thereof.

By way of example, the water soluble article, in particular the cold water or hot water-soluble article, according to the invention can be used as shopping or garbage bag; chemical packaging comprising for example pesticides, fertilizers, additives, dyes, reagent for horticultural care, detergent, bleaching compositions, additives for washing, or compositions for personal hygiene; anti-infective packaging such as bags to package and store contaminated articles and clothes from the hospital; textile packaging; food packaging such as sandwich wrapper; packaging for electronic products; packaging for agricultural product such as seed packets; and drug packaging.

Preferably, the water-soluble, in particular the cold water or hot water-soluble article, in particular the bag, according to the invention, in particular with a thickness of at least 30, 40 or 50 μm, had a bearing capacity of at least 1 kg, 2 kg, 3 kg, 4 kg or 5 kg.

The water soluble article, in particular the cold water of hot water-soluble article, according to the invention can be used as a seed film, i.e. as a film enveloping seeds.

The water-soluble article, in particular the cold water of hot water-soluble article, according to the invention can be used as a temporary carrier for the production of wigs and embroidery The water-soluble article, in particular the cold water of hot water-soluble article, according to the invention can be used for the design or pattern transfer on shaped surfaces of ceramics, plastics, metals and wooden articles, such as electrical enclosures, automotive mahogany, and mobile phone casings.

The invention will be further illustrated by the following non-limiting examples.

EXAMPLES

Example 1

Pellets according to the invention by feeding a twin-screw extruder pellet manufacturing machine with a composition comprising:

PVA 1788 66% w/w,
Coco oil 14% w/w,
Corn acetylated distarch adipate (ADiSP) 10% w/w,
Casein 10% w/w.

Films were then obtained by feeding a blow-extrusion machine with the pellets at a temperature of 125° C.-215° C. depending on the film thickness sought.

Example 2

Films prepared according to Example 1 were used to manufacture shopping bags and garbage bags of different dimensions to measure their load resistance.

| No | Bag Type | Width (cm) | Length (cm) | Thickness (μm) | Load (kg) |
|---|---|---|---|---|---|
| 1 | Shopping Bags (T-shirt model) Small Size | 16 ± 0.5 | 32 ± 0.5 | 30 ± 2 | 2.5-3.0 |
| 2 | Shopping Bags (T-shirt model) Medium Size | 28 ± 0.5 | 50 ± 0.5 | 40 ± 2 | 3.0-4.0 |
| 3 | Shopping Bags (T-shirt model) Large Size | 33 ± 0.5 | 50 ± 0.5 | 50 ± 2 | 5.0-6.0 |
| 4 | Shopping Bags (T-shirt model) X-Large Size | 40 ± 0.5 | 60 ± 0.5 | 50 ± 2 | 7.0-9.0 |
| 5 | Shopping Bags (Grip Hole Model) Small Size | 20 ± 0.5 | 30 ± 0.5 | 40 ± 2 | 0.5-1.0 |
| 6 | Shopping Bags (Grip Hole Model) Medium Size | 25 ± 0.5 | 40 ± 0.5 | 30 ± 2 | 2.5-3.0 |
| 7 | Shopping Bags (Grip Hole Model) Large Size | 33 ± 0.5 | 40 ± 0.5 | 40 ± 2 | 3.0-3.5 |
| 8 | Shopping Bags (Grip Hole Model) X-Large Size | 40 ± 0.5 | 60 ± 0.5 | 50 ± 2 | 3.5-4.5 |
| 9 | Garbage Bags, Small Size | 40 ± 0.5 | 50 ± 0.5 | 40 ± 2 | 6-7 |
| 10 | Garbage Bags, Medium Size | 60 ± 0.5 | 80 ± 0.5 | 50 ± 2 | 7-8 |
| 11 | Garbage Bags, Large Size | 60 ± 0.5 | 100 ± 0.5 | 50 ± 2 | 9-10 |

It can be seen that bags according to the invention have satisfactory load resistances.

Example 3

The water-solubility of films according to the invention was tested by immersing discs of various diameter (D) with a thickness of 30 μm in 150 mL of water maintained at different temperatures (T). The time to complete visible dissolution is determined.

| | T = 21° C. (room temperature) | T = 80° C. | T = 90° C. | T = 100° C. |
|---|---|---|---|---|
| D = 7 cm | >14 days | 2 min. 13 s | 2 min. | 2 min. |
| D = 10 cm | >14 days | 2 min. 18 s | 2 min. 11 s | 2 min. 11 s. |
| D = 15 cm | >14 days | 2 min. 25 s | 2 min. 15 s | 2 min. 15 s |

It can be seen that while being essentially completely water-soluble at temperatures of 80° C. or more, the film according to the invention is water-resistant at lower temperatures, in particular at room temperature.

Example 4

The biodegradability of films according to the invention was tested by disposing bags 38 cm in length, 22 cm in width and 35 μm in thickness on soil during 30 days outdoors without exposure to rain. 2 periods were tested, one with maximum temperatures of 30-32° C. and one with maximum temperatures of 18-22° C. The percentage of biodegradability was assessed visually.

On average, the bags were degraded at 99% in less than 25 days during the 30-32° C. period and at 85-90% during the 18-22° C. period.

Example 5

The compostability of films according to the invention was tested in a fertility test by dissolving one bag 38 cm in length, 22 cm in width and 35 μm in thickness in water and watering potted soil with the water. The soil was then seeded on day 1 with 5 to 8 ficus seeds.

On day 5-7 the seeds germinate and full plantlets can be observed by day 18.

Example 6

Pellets according to the invention by feeding a twin-screw extruder pellet manufacturing machine with a composition comprising:

A mixture of PVA0588/PVA1788/PVA1799/PVA1792 (25%/25%/25%/25%): 60% w/w,

A mixture of coco oil and palm oil (50%/50%): 25% w/w,

Corn acetylated distarch adipate (ADiSP) 15% w/w.

Films were then obtained by feeding a blow-extrusion machine with the pellets at a temperature of 125° C.-215° C. depending on the film thickness sought.

The films dissolve completely in water at 21° C. (room temperature).

The invention claimed is:

1. A pellet for manufacturing water-soluble articles comprising:

at least one polyvinyl alcohol;

at least one vegetable oil;

at least one modified starch; and at least one protein, wherein the at least one protein is present in an amount from about 7% to about 10% by weight of a total weight of the pellet.

2. The pellet according to claim 1, wherein the at least one modified starch is esterified starch, etherified starch, cationized starch, acetylated starch, and/or crosslinked starch.

3. The pellet according to claim 1, wherein the at least one vegetable oil is selected from the group consisting of soybean oil, coconut oil, castor oil, cottonseed oil, grape seed oil, rapeseed, corn oil, palm oil, linseed oil, safflower oil, olive oil, peanut oil, coconut oil, palm kernel oil, canola oil, sunflower oil, hazelnut oil, sesame oil, almond oil, lemon oil and mixtures thereof.

4. The pellet according to claim 1, wherein the at least one protein is selected from the group consisting of whey protein, almond protein, soybean protein, casein, egg white protein, and mixtures thereof.

5. The pellet according to claim 1, wherein the at least one polyvinyl alcohol is present in an amount from about 55% to about 70% by weight of a total weight of the pellet.

6. The pellet according to claim 1, wherein the at least one vegetable oil is present in an amount from about 10% to about 30% by weight of a total weight of the pellet.

7. The pellet according to claim 1, wherein the at least one modified starch is present in an amount from about 7% to about 15% by weight of a total weight of the pellet.

8. The pellet according to claim 1, further comprising at least one additional compound selected from the group consisting of a compatibilizer, a binder, a filler, a plasticizer, an agent for lower moisture absorption, a lubricant, an antioxidant, a mold release agent an antifoaming agent, a colorant, ultraviolet absorber or mixtures thereof.

9. A method for the manufacture of a water-soluble article comprising a step of heating at least one pellet according to claim 1 at a temperature of at least 5° C.

10. A water-soluble article obtained from at least one pellet according to claim 1.

11. The water-soluble article according to claim 10, wherein the water-soluble article is a film, a bag, a container, a pouch, a packaging, a glove, disposable hygiene products, or an envelope.

12. The pellet according to claim 1, wherein the at least one protein is casein.

* * * * *